United States Patent
Motoki et al.

[11] Patent Number: 5,993,502
[45] Date of Patent: Nov. 30, 1999

[54] SINTERED METAL FILTERS

[75] Inventors: Ryutaro Motoki, Hirakata; Takashige Ishida, Kawachinagano; Shigeru Tanaka, Kobe; Jun Funakoshi, Suita; Takashi Nishi, Hirakata; Akira Kosaka, Neyagawa; Tetsuo Kimura, Otsu, all of Japan

[73] Assignee: Kubota Corporation, Osaka, Japan

[21] Appl. No.: 09/272,569

[22] Filed: Mar. 19, 1999

Related U.S. Application Data

[62] Division of application No. 08/749,237, Nov. 14, 1996, Pat. No. 5,925,156.

[30] Foreign Application Priority Data

Jul. 15, 1996 [JP] Japan ................................. 8-184722
Sep. 9, 1996 [JP] Japan ................................. 8-237766

[51] Int. Cl.$^6$ ........................... B22F 7/02; B01D 53/36
[52] U.S. Cl. ........................ 55/487; 55/523; 55/524; 55/DIG. 30; 419/2; 419/6
[58] Field of Search ............... 419/2, 6; 55/487, 55/523, 524, DIG. 30

[56] References Cited

U.S. PATENT DOCUMENTS

| | | | |
|---|---|---|---|
| 2,267,918 | 12/1941 | Hildabolt | 55/523 |
| 3,022,187 | 2/1962 | Eyraud et al. | 55/523 |
| 4,629,483 | 12/1986 | Stanton | 55/487 |
| 4,728,503 | 3/1988 | Iida et al. | 55/486 |
| 4,746,341 | 5/1988 | Komoda | 55/487 |
| 4,810,273 | 3/1989 | Komoda | 55/487 |
| 5,126,103 | 6/1992 | Ishizaki et al. | 419/2 |
| 5,468,273 | 11/1995 | Pevzner et al. | 55/523 |
| 5,486,220 | 1/1996 | Honda et al. | 55/523 |

FOREIGN PATENT DOCUMENTS

| | | |
|---|---|---|
| 0 467 147 A1 | 1/1992 | European Pat. Off. . |
| 0 561 001 A1 | 9/1993 | European Pat. Off. . |
| 0 707 910 A2 | 4/1996 | European Pat. Off. . |
| 949 280 | 2/1949 | France . |
| 2 019 732 | 11/1970 | Germany . |
| 43-7114 | 3/1968 | Japan . |
| 56-149363 | 11/1981 | Japan . |
| 1 313 795 | 4/1973 | United Kingdom . |

*Primary Examiner*—Daniel J. Jenkins
*Attorney, Agent, or Firm*—Armstrong, Westerman, Hattori, McLeland, & Naughton

[57] ABSTRACT

A sintered porous metal filter permitting passage of gases therethrough comprises a filter portion having specified pores for trapping dust as separated from the gas to be treated, and a support portion for supporting the filter portion, the support portion having pores greater than the pores of the filter portion to diminish the pressure loss of the gas to be treated, the filter portion comprising metal particles of small diameter, the support portion comprising metal particles having a greater diameter than the filter portion forming metal particles, the filter portion and the support portion being formed to provide an outer side and an inner side integral therewith by sintering the two kinds of metal particles by hot isostatic pressing. A catalyst reaction portion for rendering noxious components of the gas to be treated harmless is formed in the filter portion or the support portion, or as an independent catalyst layer.

5 Claims, 15 Drawing Sheets

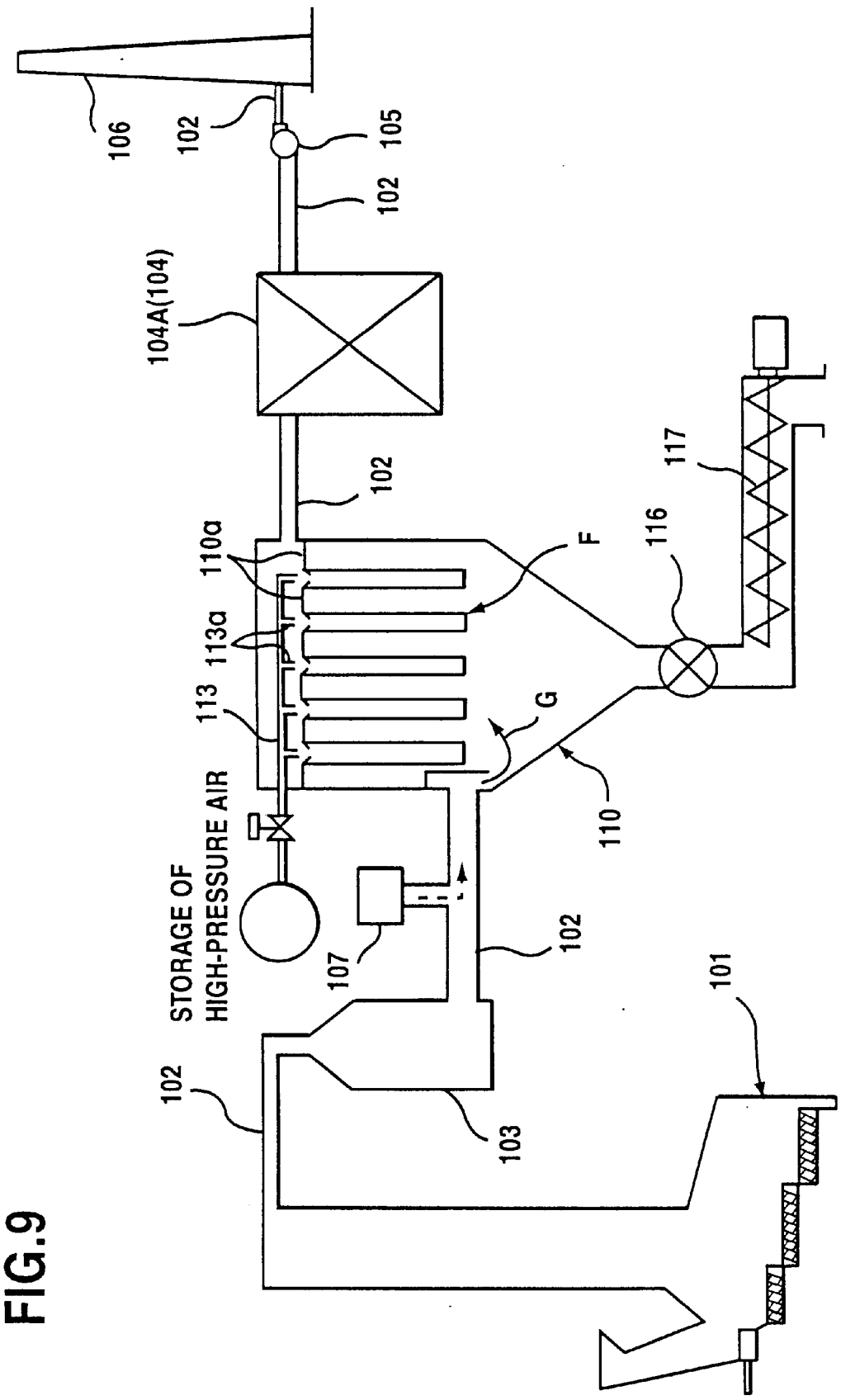

FIG.10A
FIG.10B
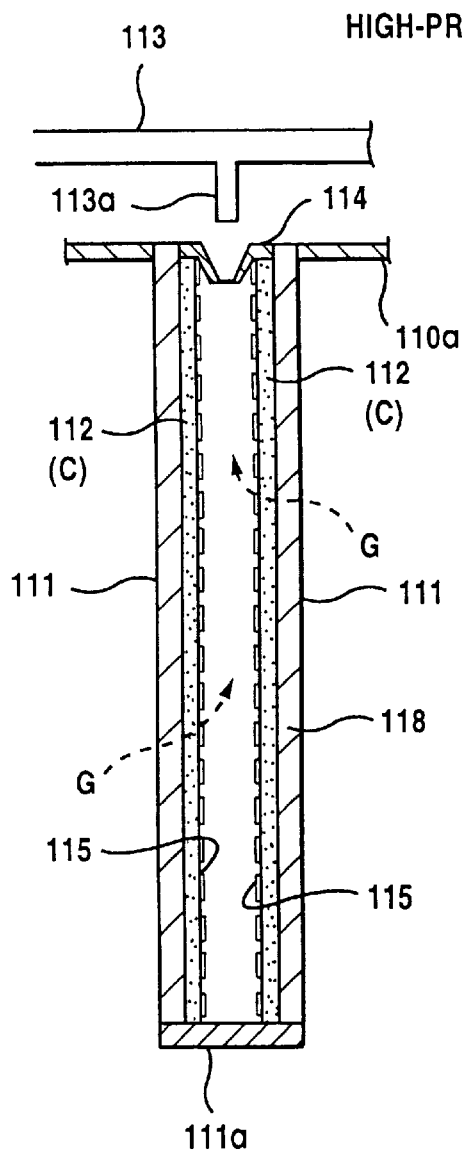
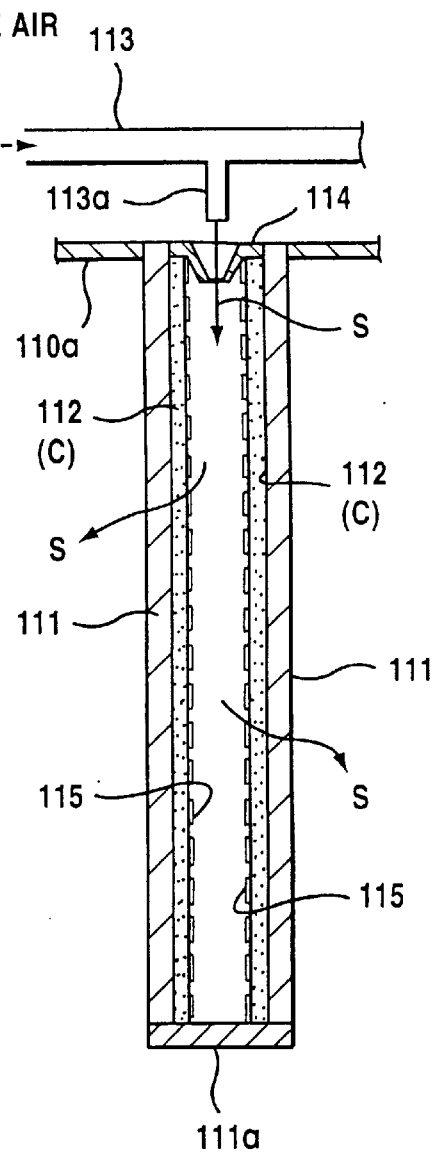

FIG.13A
FIG.13B
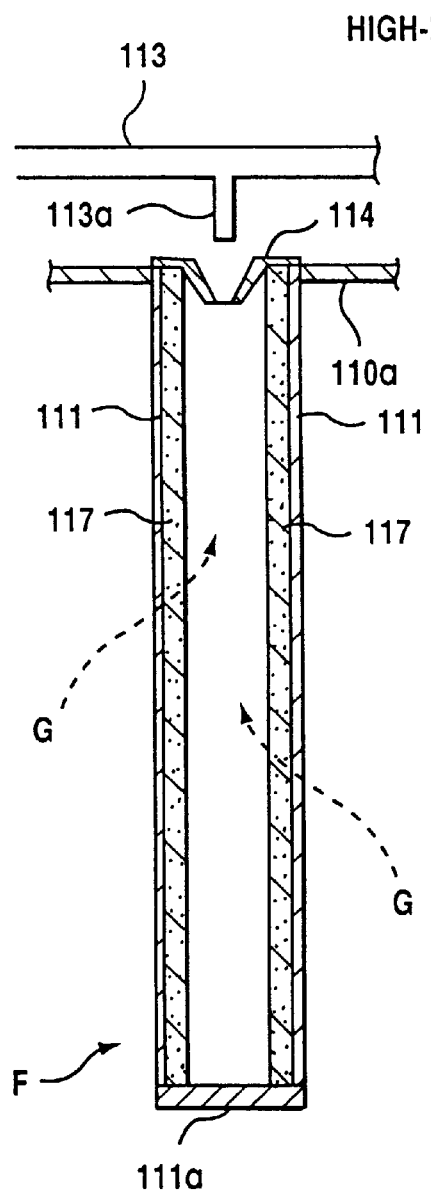
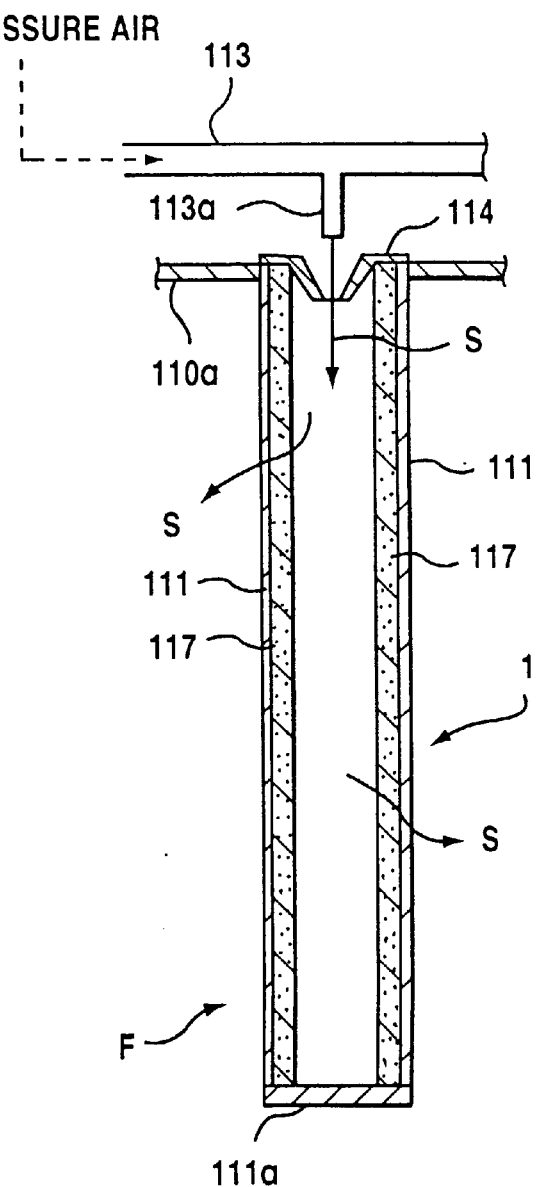

SINTERED METAL FILTERS

This application is a Division of prior application Ser. No. 08/749,237 filed on Nov. 14, 1996, now U.S. Pat. No. 5,925,156.

FIELD OF THE INVENTION

The present invention relates to sintered filters for use under high-temperature conditions, and more particularly to sintered metal filters for use in combustion exhaust gas treating apparatus for refuse incinerators.

BACKGROUND OF THE INVENTION

Combustion exhaust gas treating apparatus for incinerators for refuse such as garbage are adapted to discharge combustion exhaust gas from a combustion unit 101 through a chimney 106 by means of an induced draft blower 105 as shown in FIG. 15. A flue 102 for conducting the exhaust gas from the combustion unit 101 is provided as arranged one after another with a unit 103 for adjusting the temperature of the exhaust gas, a bag filter 120, a unit 122 for heating the exhaust gas and a catalytic reactor 121. The temperature adjusting unit 103 cools the exhaust gas once, followed by removal of soot and dust from the gas by the bag filter 120 and then by reheating of the gas by the heating unit 122. Harmful substances such as nitrogen oxides and dioxin are thereafter removed from the exhaust gas by the catalytic reactor 121.

The combustion exhaust gas is cooled first because the upper limit temperature at the inlet of the bag filter is about 150 to 200° C., and the gas is reheated because the temperature permitting the catalyst to retain its activity is about 210 to 450° C.

The exhaust gas treating apparatus thus cools and reheats the exhaust gas and therefore has the problem that the exhaust gas treatment entails an undesirable heat loss. However, if the catalytic reactor is disposed to the front of the bag filter, soot and dust will adhere to the surface of the catalyst within the reactor to rapidly impair the properties of the catalyst, so that it is impossible to change the order of arrangement of the bag filter and the reactor.

Further since the bag filter has the pores of its bag clogged with adhering soot and dust, the filter needs to be periodically treated by reverse-pressure cleaning. The catalyst in the reactor must have its surface regenerated. The provision of the bag filter for dust removal and the catalytic reactor for making the exhaust gas harmless renders the equipment large-sized and more costly. Moreover, a great heat loss will result if the exhaust gas is reheated to an excessively high temperature, whereas lower reheating temperatures make it necessary to increase the area of contact between the catalyst and the exhaust gas in order to enable the reactor to function satisfactorily. This entails the problem of making the reactor greater in size.

To overcome the above problems, it has been proposed to use a bag of inorganic material such as a heat-resistant ceramic fiber as the bag filter, but it is then difficult to prevent the alterations in the pore size of the ceramic filter due to reverse-pressure cleaning since the filter is made also of a fabric, hence the problem of low stability in removing fine dust.

An object of the present invention is to eliminate the foregoing drawbacks and to provide means for reliably removing fine dust from the combustion exhaust gas, the means being also adapted, when required, to render harmless the harmful substances contained in the exhaust gas.

SUMMARY OF THE INVENTION

The present invention provides a sintered metal filter comprising a filter portion having specified pores for trapping dust as separated from the gas to be treated, and a support portion for supporting the filter portion, the support portion having pores greater than the pores of the filter portion to diminish the pressure loss of the gas to be treated, the filter portion comprising a layer of metal particles of small diameter, the support portion comprising a layer of metal particles having a greater diameter than the filter portion forming metal particles, the filter portion and the support portion being formed to provide an outer side and an inner side integral therewith by preliminarily molding the two layers preferably into an integral layer and thereafter sintering the molded layers by hot isostatic pressing (HIP).

The invention provides another sintered metal filter which comprises a filter portion having specified pores for trapping dust as separated from the gas to be treated, the pores of the filter portion having partly accommodated therein catalyst particles for undergoing a catalytic reaction with harmful substances contained in the gas to render the harmful substances harmless, the filter portion comprising metal particles and being formed by hot isostatically pressing the metal particles and the catalyst particles as suitably made present in interstices between the metal particles.

The invention provides another sintered metal filter which comprises a filter portion having specified pores for trapping dust as separated from the gas to be treated, and a support portion for supporting the filter portion, the support portion having pores greater than the pores of the filter portion to diminish the pressure loss of the gas to be treated, the pores of the support portion having partly accommodated therein catalyst particles for undergoing a catalytic reaction with harmful substances contained in the gas to render the harmful substances harmless, the filter portion comprising metal particles of small diameter, the support portion comprising metal particles having a greater diameter than the filter portion forming metal particles, the filter portion and the support portion being formed to provide an outer side and an inner side integral therewith by hot isostatically pressing the metal particles of different diameters and catalyst particles as suitably made present in interstices between the support portion forming metal particles.

The invention provides still another sintered metal filter which comprises a filter portion having specified pores for trapping dust as separated from the gas to be treated, and a catalyst reaction portion for undergoing a catalytic reaction with harmful substances contained in the gas to render the harmful substances harmless, the filter portion and the catalyst reaction portion being formed to provide an outer side and an inner side integral therewith by hot isostatically pressing metal particles for forming the filter portion and catalyst particles for forming the reaction portion.

BRIEF EXPLANATION OF THE DRAWINGS

FIG. 9 is a diagram for illustrating refuse incinerating equipment to show an exemplary application of metal filters having a catalyst reaction portion and embodying the invention;

FIGS. 10A and 10B are views in vertical section showing an embodiment of metal filter of the invention having a catalyst reaction portion;

FIGS. 13A and 13B are views in vertical section showing another embodiment of metal filter of the invention having a catalyst reaction portion;

DETAILED DESCRIPTION OF THE INVENTION

Figure 1A:
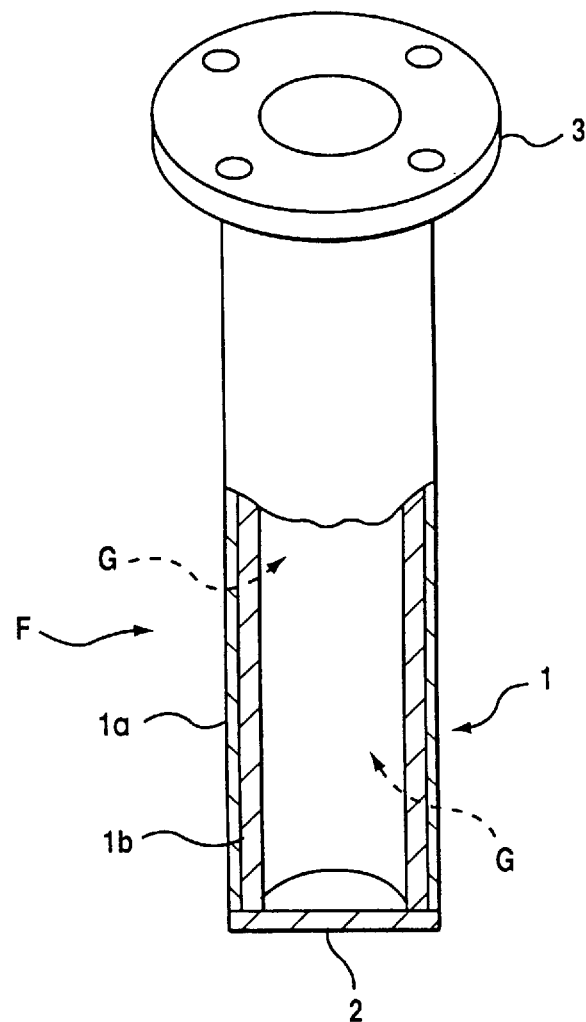
FIG. 1A is a perspective view partly broken away and showing a metal filter embodying the invention.

Metal filters of the invention will be described with reference to the embodiments shown in the drawings.

First, a description will be given of metal filters which are used only for removing fine dust contained in the combustion exhaust gas of refuse incinerators.

FIG. 1A shows a metal filter F, which comprises a tubular main body 1 prepared by forming metal particles into a tube by sintering, a bottom plate 2 closing one end of the main body 1, and a flange 3 attached to the other end of the main body 1 by welding. The metal filter F is adapted to pass the combustion exhaust gas G of a refuse incinerator thereinto from outside. The metal filter thus constructed is usable in place of the bag of a bag filter for removing soot and dust from high-temperature exhaust gases, and can be cleaned with a high-pressure gas. Moreover, since the passage of exhaust gas involves a diminished pressure loss as will be described below, the area of filtration can be smaller than that of the conventional bag filter. The metal filter is usable as dust removing means with good stability for a prolonged period of time since there is no likelihood that the pore size will be altered by reverse-pressure cleaning.

Figure 1B:
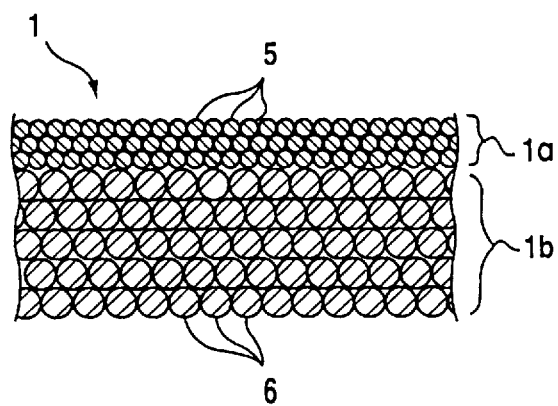
FIG. 1B is an explanatory view for illustrating particles forming the metal filter of FIG. 1A.

With reference to FIG. 1A, the main body 1 of the metal filter F comprises a filter portion 1a and a support portion 1b which are formed by hot isostatic pressing to respectively provide an outer layer and inner layer integral therewith. As shown in FIG. 1B, metal particles 5 of small diameter are used for forming the filter portion 1a, and metal particles 6 greater than the metal particles 5 for the filter portion in diameter are used for forming the support layer 1b. A layer of particles for forming the filter portion and a layer of particles for forming the support portion are sintered by hot isostatic pressing, whereby a small pore size is given to the filter portion 1a and a great pore size to the support portion 1b. This imparts sufficient strength to the metal filter obtained although the support portion 1b is low in resistance to the passage of gas. The pore size of the filter portion 1a can be easily controlled, for example, when a material having a high sintering temperature is used for the filter portion forming particles 5 so as to be sintered to a low degree. The support portion 1b can be assured of sufficient strength to satisfactorily support the filter portion when a material having a lower sintering temperature than the material for the filter portion forming particles 5 is used for the support portion forming particles 6 so as to be sintered to a full extent. Especially when the filter portion 1a and the support portion 1b are integrally sintered isostatically under a high pressure, the particles can be satisfactorily sintered at a relatively low temperature, consequently giving sufficient strength to the metal filter. This makes it possible to reduce the thickness of the filter portion 1a and to diminish the resistance to the passage of gas through the support portion 1b, with the result that the pressure loss of the gas to be passed through the metal filter can be reduced without increasing the area of filtration. Accordingly, equipment incorporating the metal filter, such as dust removing equipment, can be compacted.

It is desirable that the pores of the filter portion 1a have a pore size distribution satisfying the relationship of:

$$(D95-D5)/D50 \leq 1.5$$

wherein D5 is the pore size on the cumulative distribution curve of the pore sizes for a cumulative frequency of 5%, D50 is the pore size on the curve for a cumulative frequency of 50% and D95 is the pore size on the curve for a cumulative frequency of 95%. When made to have such a pore size distribution, the pores of the filter portion have a narrow size distribution, and formation of pores smaller than is necessary can be prevented relative to the minimum particle size of dust to be arrested. More specifically, the minimum particle size of dust to be arrested by the filter portion corresponds to the pore size for a cumulative frequency of 100%. With formation of fine pores prevented, the filter is allowed to exhibit its characteristics without increasing the resistance to the passage of gas. Incidentally, the cumulative distribution curve of the pore sizes can be obtained by measuring the pore sizes of the filter portion, and counting the pores in the order of increasing pore size to determine the cumulative numbers of the pore sizes.

To realize the pore size distribution ratio given above, the particle size distribution of the filter portion forming metal particles is so controlled as to have the relationship of:

$$(R95-R5)/R50 \leq 1.0$$

wherein R5 is the particle size on the cumulative distribution curve of the particle sizes for a cumulative frequency of 5%, R50 is the particle size on the curve for a cumulative frequency of 50% and R95 is the particle size on the curve for a cumulative frequency of 95%. Preferably, the particle size distribution ratio is controlled to 0.8 to 1.0 (to save labor for classification). Thus, we have found that the pores of suitable size can be formed in this way. The cumulative distribution curve of the particle sizes of the metal particles can be obtained by measuring the particle sizes of the metal particles, and counting up the particles in the order of increasing particle size to determine the cumulative numbers of the particle sizes.

It is desired that the metal particles to be used for forming the support portion have an average particle size greater than the average particle size of the filter portion forming metal particles but not greater than three times the average particle size. This prevents the latter metal particles to enter the interstices of the support portion forming particles while giving suitable strength to the support portion, consequently preventing the pressure loss of the gas to be passed from increasing without the necessity of giving an increased filtration area to the metal filter.

Figure 2A:
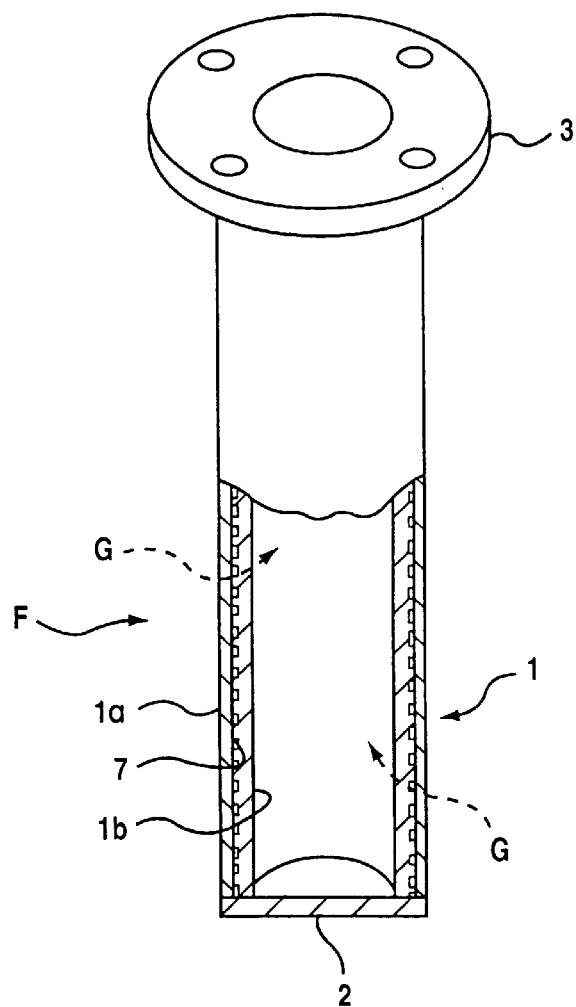
FIG. 2A is a perspective view partly broken away and showing another metal filter embodying the invention.
Figure 2B:
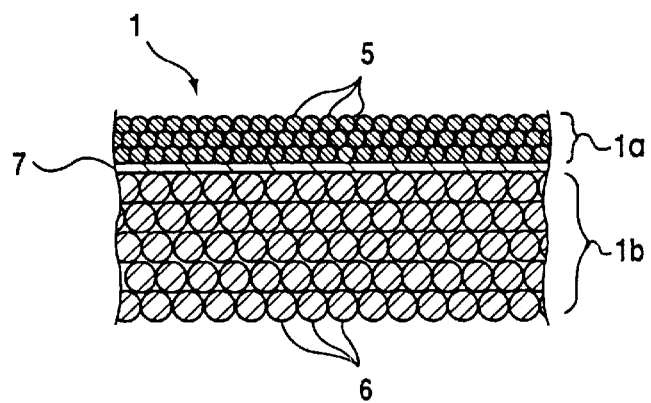
FIG. 2B is an explanatory view for illustrating particles forming the metal filter of FIG. 2A.

As shown in FIGS. 2A and 2B, the filter portion 1a and the support portion 1b can be sintered by hot isostatic pressing with a metal reticular member 7 interposed therebetween to provide an outer layer and an inner layer integral therewith. Preferably, the metal reticular member 7 has openings smaller than the minimum particle size of the filter portion forming particles. The reticular member 7, when provided, renders the premolded body easy to handle before sintering even if the filter portion 1a is thin, making it possible to produce a metal filter having diminished resistance to the passage of gas. More specifically, the member 7 prevents the filter portion forming particles from becoming mixed with the support portion forming particles, permitting the filter portion 1a and the support portion 1b to be formed as separate layers and serving to hold the premolded body in shape before sintering.

Preferably, the opening size of the metal reticular member 7 is at least 30% of the average particle size of the filter portion forming particles because the member 7, if interposed, then will not give the metal filter increased resistance to the passage of gas.

If a metal net is used as the reticular member 7, the openings of the net provide pores for passing the gas more effectively. When the filter portion 1a has a pore size matching the minimum particle size of dust to be arrested, with the support portion 1b given such a pore size as to ensure satisfactory gas flow, the filter portion 1a supported by the metal reticular member 7 can be sintered even if having a small thickness, consequently making it possible to provide a metal filter which is diminished in gas-flow resistance. Further when the material for the metal reticular member 7 is suitably selected, it becomes easy to form the filter portion 1a and the support portion 1b from different materials in the form of metal particles. If the metal reticular member 7 is made of a material which is satisfactorily bondable to both the filter portion and the support portion in this case, the filter portion and the support portion are united with greater strength. Thus, it becomes easy to prepare the filter portion from a material which readily permits control of the pore size and to use metal particles of a material which is highly amenable to sintering for the support portion.

With reference to FIGS. 2A and 2B, the metal filter shown has, for example, the following dimensions. The filter portion 1a is about 0.6 mm in thickness, the support portion 1b is about 1.4 mm in thickness, the metal reticular member 7 is about 0.1 mm in thickness, and the tubular body formed by sintering is about 100 mm in outside diameter.

The particles to be used for forming the filter portion 1a are preferably those prepared by the gas atomization process and classified to particle sizes in the range of 90 to 100 $\mu$m (−145 to +170 mesh). The material for the filter portion forming particles may be at least one metal selected from among heat-resistant alloys such as Ni alloys or Co alloys, stainless steels (such as SUS304, SUS316 and SUS316L), Ti, Cr and alloys resistant to high-temperature corrosion, such as Ti alloys and Cr alloys, in conformity with the purpose of use. Alternatively, the material may be at least one ceramic selected from among ceramic materials such as cordierite. The metal particles may be used as admixed with ceramic particles which are compatible therewith.

The particles to be used for forming the support portion 1b are preferably those prepared by the gas atomization process and classified to particles sizes in the range of 300 to 420 $\mu$m (−36 to +48 mesh). The material for the support portion forming particles may be the same metal as selected for the filter portion forming particles.

The metal reticular member 7 to be used is preferably one woven of a wire with a diameter of 0.053 mm and having openings 74 $\mu$m in size, which are smaller than the minimum particle size, i.e., 90 $\mu$m, of the filter portion forming particles and greater than the pore size of the filter portion to be described below (for example, 200-mesh standard sieve according to JIS). The material for the metal reticular member is at least one metal selected from among Ni alloys, Co alloys, stainless steels (SUS304, SUS316, SUS316L and the like), Ti, Cr and alloys resistant to heat and/or resistant to high-temperature corrosion, such as Ti alloys and Cr alloys, in conformity with the purpose of use.

In forming the filter portion and the support portion, particles having particle sizes in the foregoing ranges (the filter portion forming particles 90 to 100 $\mu$m in size, the support portion forming particles 300 to 420 $\mu$m in size) are sintered by hot isostatic pressing, whereby the filter portion can be decreased in pore size and the support portion can be increased in pore size, with the result that the sintered product obtained is 17 to 20 $\mu$m in the pore size of the filter portion and 50 to 100 $\mu$m in the pore size of the support portion. Thus, the support portion 1b is adapted to offer lower gas-flow resistance even if having an increased thickness.

Incidentally, if the support portion is 100 $\mu$m in pore size, it is likely that filter portion forming particles will ingress into the pores of the support portion to close the pores unless the metal reticular member 7 is provided. In the case where no reticular member is used, therefore, the particle size range of the support portion forming particles needs to be so determined as not to permit filter portion forming particles to fill the interstices between the support portion forming particles. For example, when the filter portion forming particles are 100 $\mu$m in average particle size and when the particle size distribution ratio thereof (a value obtained by dividing the difference between the particle size on the cumulative distribution curve of the particles sizes of the filter portion particles for a cumulative frequency of 95% and the particle size on the curve for a cumulative frequency of 5%, by the average particle size) is about 1, it is desired that the average particle size of the support portion forming particles be not greater than 300 $\mu$m.

The metal filter can be thus formed with ease which has sufficient strength, and is about 30 $\mu$m in the minimum particle size of dust to be arrested, low in gas-flow resistance and free of the likelihood of high-temperature corrosion.

The particles sizes of the filter portion forming particles and the support portion forming particles and the opening size of the metal reticular member are given above merely as examples and are of course variable suitably.

The metal filter of the present invention are produced by forming a filter portion particle layer on the inner surface of a hollow cylindrical die with filter portion forming particles, disposing inside the filter portion particle layer a metal reticular member having openings with a size not smaller than 30% of the average particle size of the filter portion forming particles and smaller than the minimum particles size of the filter portion forming particles, forming a support portion particle layer inside the metal reticular member with support portion forming particles having an average particle size at least twice the average particle size of the filter portion forming particles, preliminarily molding the filter portion particle layer, the metal reticular member and the support portion particle layer into an integral tubular body and sintering the tubular molded body by hot isostatic pressing.

An example of process for producing the metal filter of the invention will be described next with reference to FIGS. 3 to 7.

Figure 3:
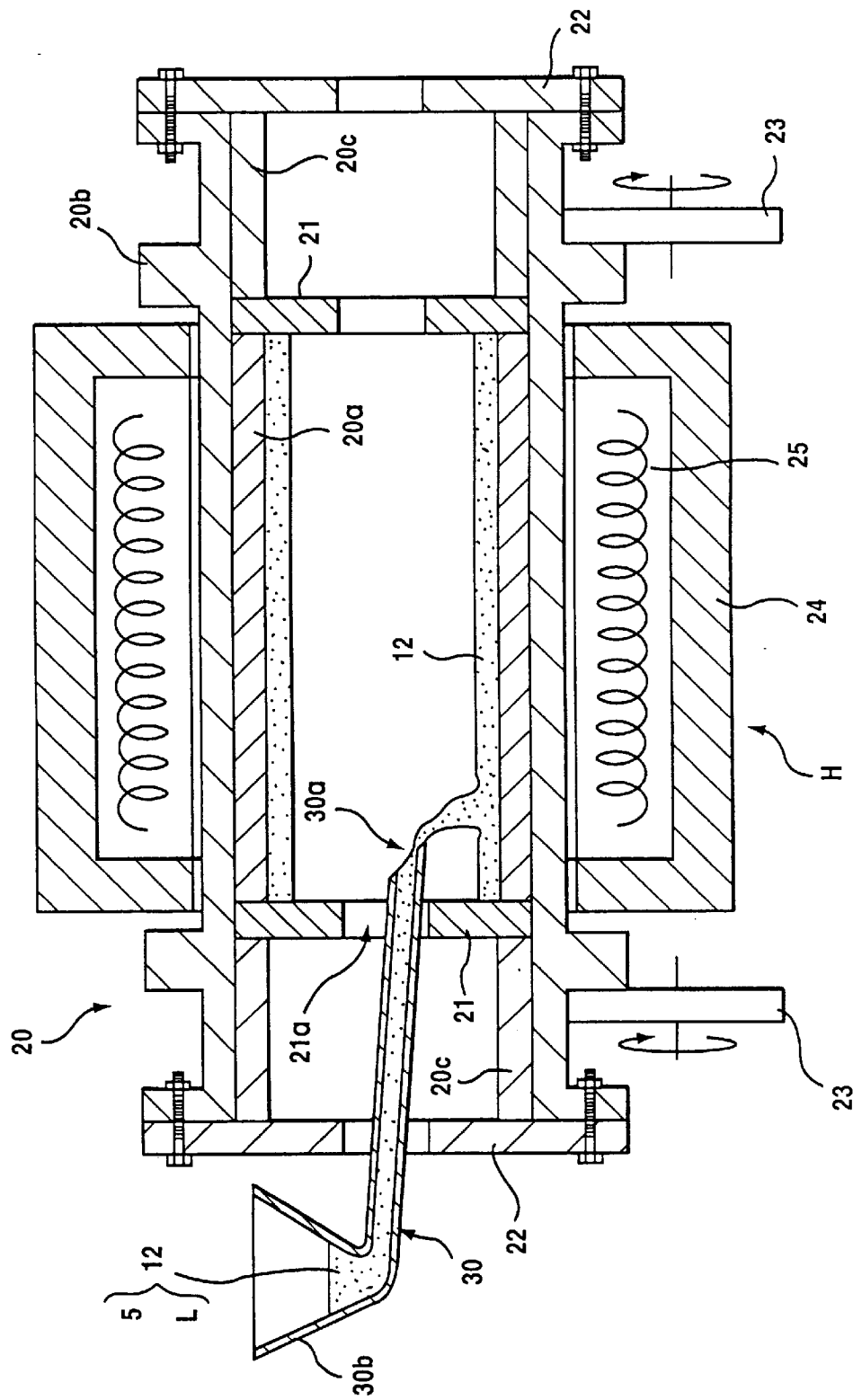
FIG. 3 is a schematic view in vertical section of a molding device to show an example of premolding step of a process for producing metal filters.
Figure 4:
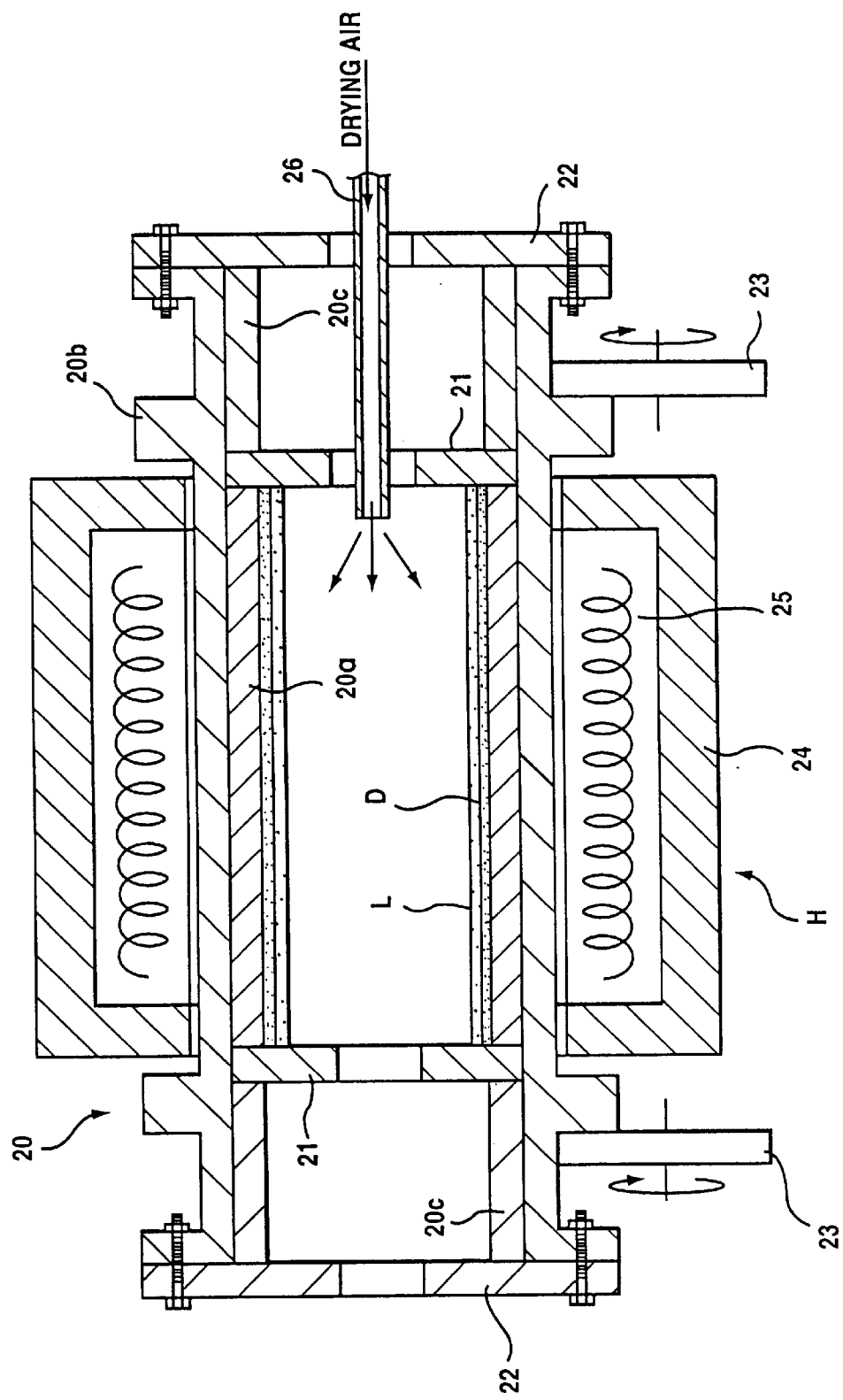
FIG. 4 is a schematic view in vertical section of the molding device to show a premolding step subsequent to the step shown in FIG. 3.

First as seen in FIG. 3, a filter portion forming slurry 12 prepared from filter portion forming particles 5 as screened with use of a sieve to −145 mesh to +170 mesh (about 90 to about 100 μm in particle size range), water serving as a dispersion medium L, a dispersant and a binder is poured onto the inner surface of a centrifugal molding die 20, 100 mm in inside diameter and serving as a hollow cylindrical die, while rotating the die at a high speed. The die 20 is rotated at such a speed that the particles 5 to be poured in will be subjected to a sufficient centrifugal force (e.g., 300 r.p.m.). The centrifugal molding die 20 comprises a die body 20a fitted in a rotary frame 20b, a barrier 21 disposed at each end of the die body 20a, and a fixing member 20c disposed at the outer side of each barrier 21. End plates 22 arranged at the outer sides of the respective fixing members 20c, 20c are fixedly fastened to the rotary frame 20b, whereby the die body 20a is fixed to the rotary frame 20b. The die 20 is supported by a pair of rollers 23 disposed close to the respective opposite ends of the die and is rotated by rotatingly driving the rollers 23. A heater block H is provided around the die 20 so as to cover the die body 20a. The heater block H has a heater 25 provided inside a heater cover 24 comprising circumferentially divided two segments.

A specified amount of filter portion forming slurry 12 is supplied to a hopper 30b of a trough 30 and poured into the die body 20a through a spout 30a inserted into a material inlet 21a of the barrier 21 while holding the particles suspended in the dispersion medium. After the slurry 12 has been completely poured in, the trough 30 is retracted with the die 20 held in rotation, permitting the particles 5 to separate from the dispersion medium L under gravity and to deposit on the inner surface of the die body a, whereby a deposit layer D is formed (see FIG. 4).

Figure 5:
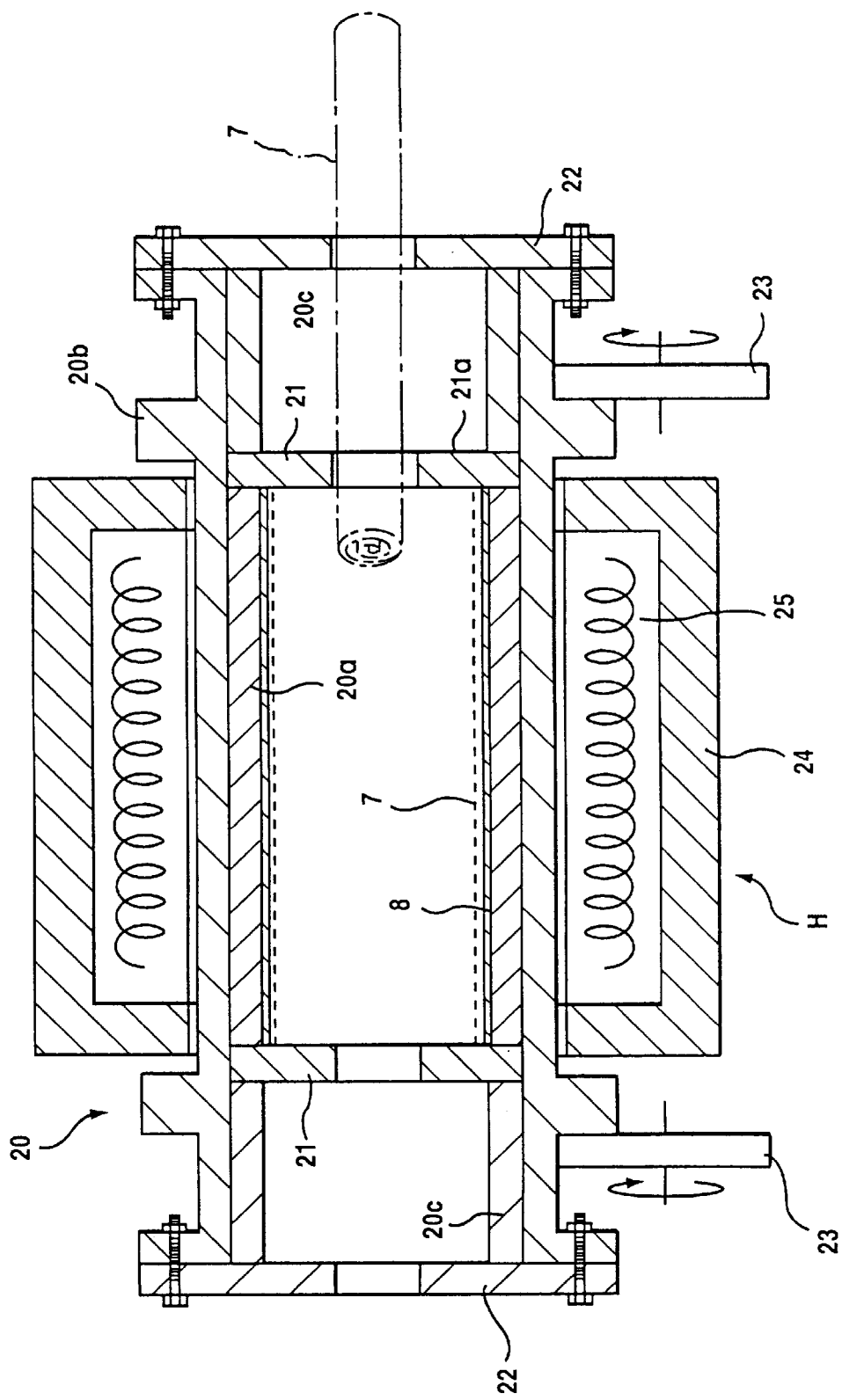
FIG. 5 is a schematic view in vertical section of the molding device to show a premolding step subsequent to the step of FIG. 4.

With the start of formation of the deposit layer D, the die is heated by the heater 25, and an air pipe 26 is inserted into the die body 20a at the same time through an opening in the end plate 22 of the die 20 to inject drying air inside the barriers 21 (see FIG. 4), whereby the dispersion medium L of the slurry 12 is evaporated to form a filter portion particle layer 8 on the inner surface of the die body 20a (see FIG. 5).

After the formation of the particle layer 8, the air pipe 26 is withdrawn, and a nickel net 7 corresponding to the 200-mesh standard sieve prescribed in JIS and wound into a slender roll is inserted inside the barrier 21 through the opening of the end plate 22 and material inlet 21a, rotated with the die 20, centrifugally unwound and placed over the inner surface of the filter portion particle layer 8 to serve as a metal reticular member.

Figure 6:
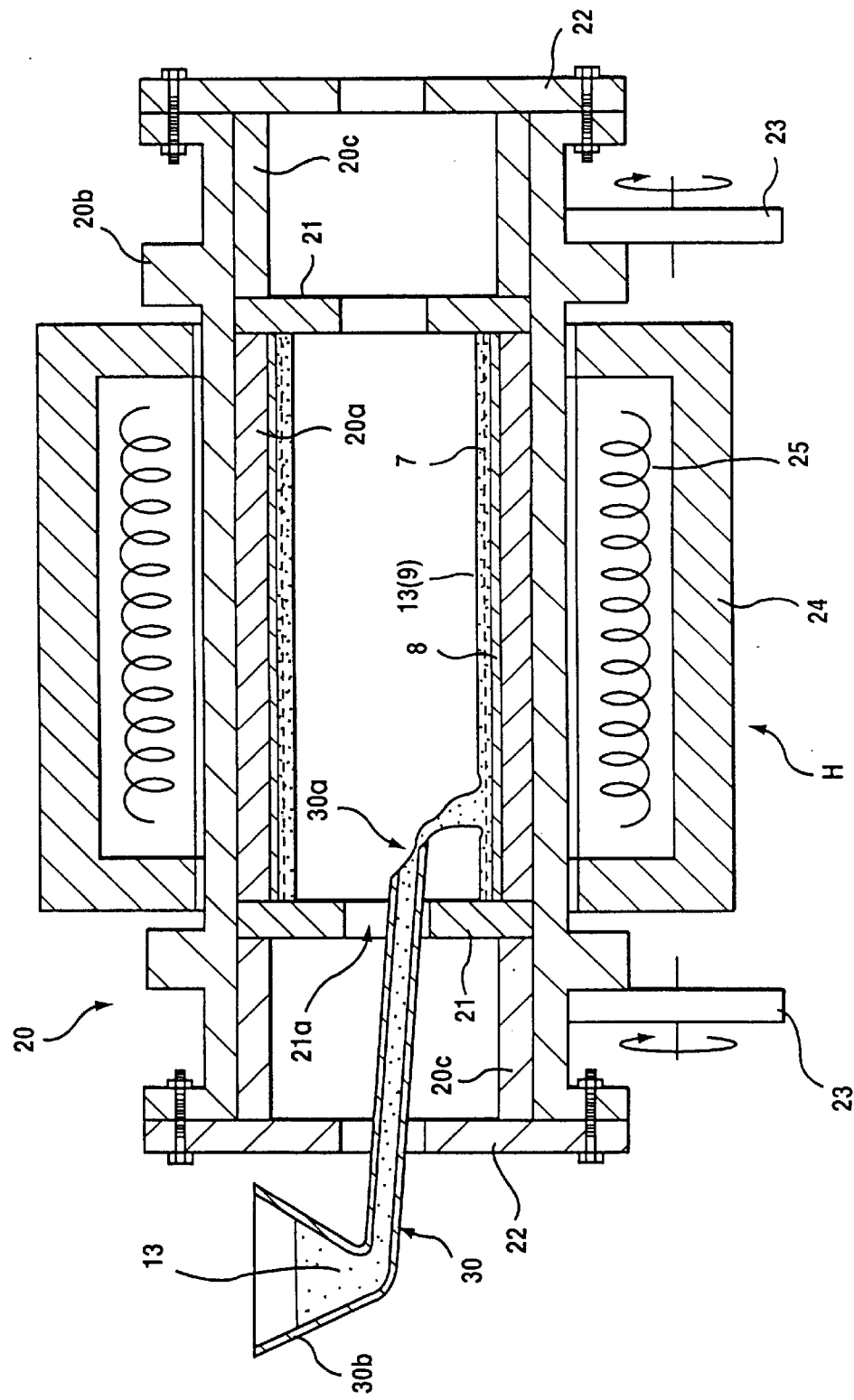
FIG. 6 is a schematic view in vertical section of the molding device to show a premolding step subsequent to the step of FIG. 5.

After the nickel net 7 has been placed in position, a specified amount of support portion forming slurry 13 comprising particles 6 as classified to −36 mesh to +48 mesh (about 300 to about 400 μm) is supplied to the hopper 30b like the filter portion forming slurry 12 as shown in FIG. 6 and poured into the die inside the nickel net 7 through the spout 30a of the trough 30 inserted into the die through the material inlet 21a of the barrier 21. With the die 20 held as it is in rotation, the slurry 13 is separated under gravity, causing the support portion forming metal particles 6 to separate from the dispersion medium L and deposit on the inner surface of the nickel net 7, followed by drying as in the case of the filter portion forming slurry 12 to form a support portion forming particle layer 9. The layer is formed separately with a uniform thickness since the filter portion forming particle layer 8 is covered with the nickel net 7 and therefore will not be washed when the support portion forming slurry 13 is poured inside the particle layer 8.

The dispersant to be incorporated Into the filter portion forming slurry 12 and the support portion forming slurry 13 is preferably such that the dispersant will readily evaporate off when the dispersion medium L is evaporated. The binder should be such an agent that it will produce no adverse effect on the hot isostatic pressing of the filter portion forming particles 5, support portion forming particles 6 and metal reticular member 7. For example, a water-soluble binder, water-soluble resin or the like is usable.

Figure 7:
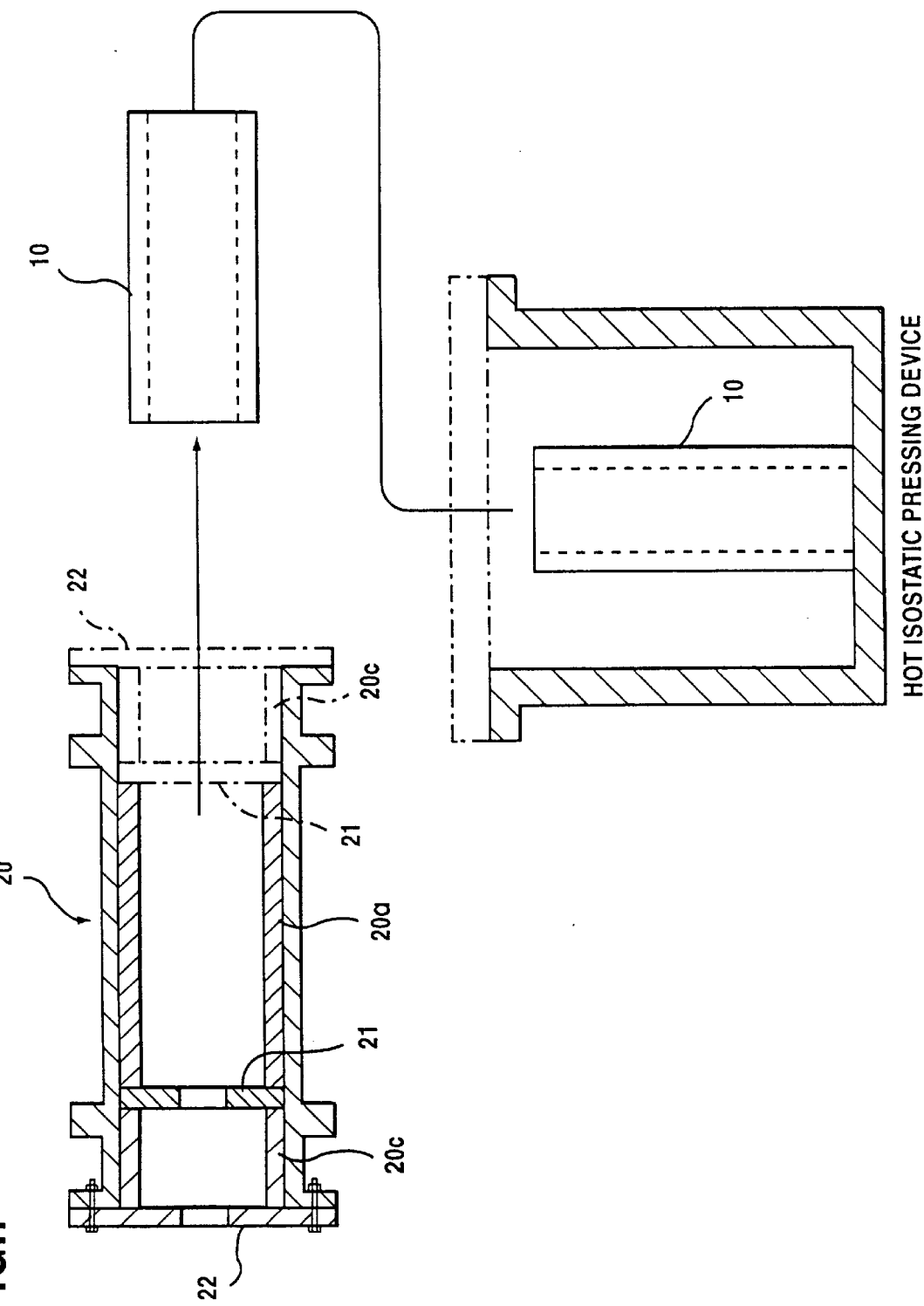
FIG. 7 is a diagram illustrating the process after the premolding steps.

After the formation of the support portion particle layer 9, the centrifugal molding die 20 is held out of rotation, the end plate 22 is removed from one side, the fixing member 20c and the barrier 21 are removed from the same side, and the molded tubular body 10 comprising the particle layer 8, metal reticular member 7 and particle layer 9 is withdrawn from the die 20 and placed into a hot isostatic pressing device shown in FIG. 7, in which the body is sintered to obtain a filter main body 1 (exemplary sintering conditions: 700° C., 100 MPa, 3 hours). A flange 3 and a bottom plate 2 are Joined to the main body 1 by welding to obtain a metal filter F.

The average particle size, or the maximum particle size and particle size range of the filter portion forming particles 5 are determined in accordance with the particle size of the dust to be removed from the gas to be treated. Further the aforementioned pore size distribution ratio is determined in accordance with the contemplated purpose, and the particle size distribution ratio of the filter portion forming particles 5 is determined in corresponding relation to the former ratio. As previously stated, the pore size distribution ratio has a close correlation with the particle size distribution ratio. The result of actual measurement indicates that the regression coefficient of the particle size distribution ratio to the pore size distribution was about 0.87, the contribution rate was about 0.04, and the regression line was in very close accord with the measurement of pore size.

The opening size, wire diameter, etc. of the metal reticular member 7 are suitably determined mainly in accordance with the particle size distribution of the filter portion forming particles 5.

The metal reticular member 7 can be dispensed with. In this case, the average particle size of the support portion forming particles 6 is preferably greater than the average particle size of the filter portion forming particles 5 and not greater than three times the average particle size, and is more preferably smaller than twice the minimum particle size of the filter portion forming particles 5 and greater than 1.2 times the minimum particle size. The filter portion forming particles 5 will not ingress into the interstices between the support portion forming particles 6 which are sized in this range, and the flow of gas through the metal filter is unlikely to be impeded by the support portion 1b formed by such particles.

Although the support portion 1b is provided in the form of a hollow cylinder inside the filter portion 1a according to the foregoing embodiments, the support portion 1b may be formed outside the filter portion 1a. Further the filter portion 1a, as well as the support portion 1b, may be planar to form a filter.

While the filter portion particle layer 8 and the support portion particle layer 9 are formed by centrifugal molding according to the embodiment described, one or both of the layers may be formed by applying a paste by coating, or by dry centrifugal molding on a molded surface of the sintered type.

Although the metal reticular member 7 is centrifugally affixed to the inner surface of the filter portion forming particle layer 8 according to the foregoing embodiment, the metal reticular member 7 may alternatively be a porous metal plate or metal membrane in a reticular form. The reticular member 7 may be affixed to the inner surface of the filter portion forming particle layer 8 at rest in the case where centrifugal molding is resorted to as described above. In this case, the same binder as used for the filter portion particle layer 8 or an adhering substance of different kind can be used for affixing.

The acceleration of the centrifugal force to be applied by the speed of rotation of the molding die 20 to the filter portion forming particles 5 to be poured in should be determined as desired in accordance with the properties of the filter portion forming particles 5 and the dispersion medium L. For example, when the specific gravity difference between the particles 5 and the dispersion medium L is small, or when the dispersion medium L has a high kinematic viscosity, it is desirable to use a high speed of rotation in order to shorten the molding time.

Figure 8:
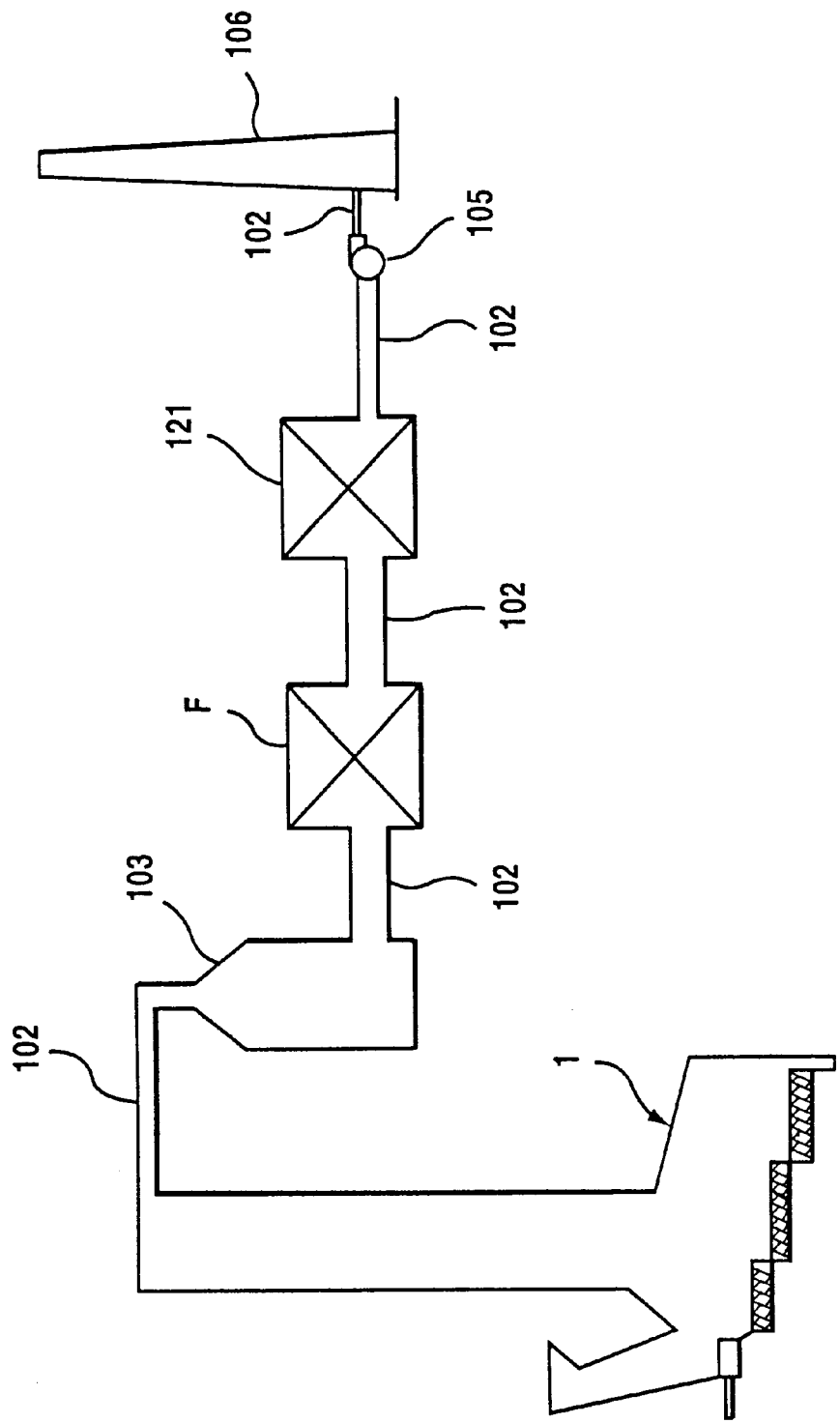
FIG. 8 is a diagram for illustrating refuse incinerating equipment as an example where the metal filter of the invention is used.
Figure 15:
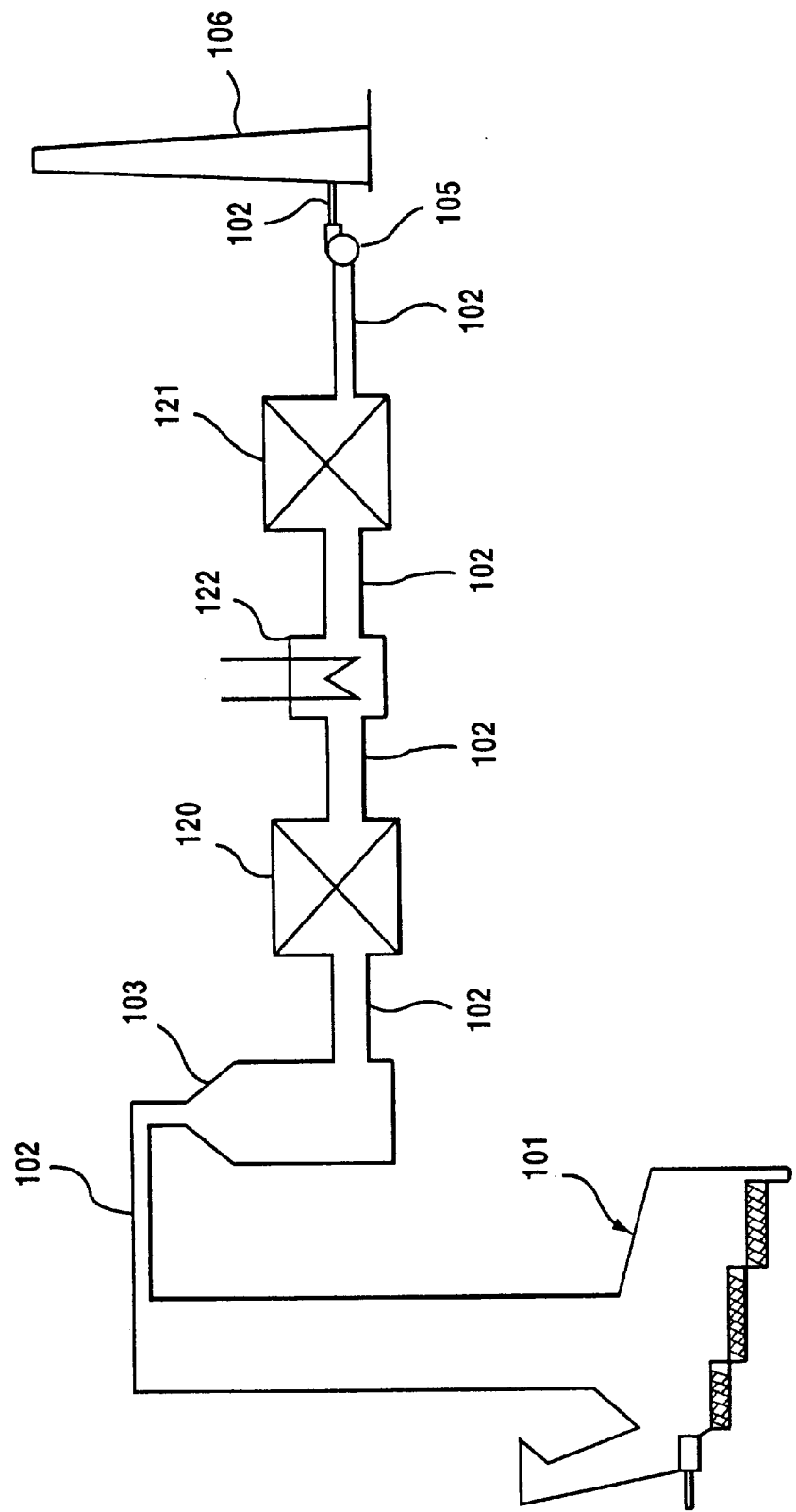
FIG. 15 is a diagram for illustrating a conventional combustion exhaust gas treating apparatus.

The metal filters described above are favorably usable as a replacement for the bag filter 120 included in the combustion exhaust gas treating apparatus of the conventional refuse incinerator shown in FIG. 15. In this case, the metal filter of the invention has the advantage that the exhaust gas having a high temperature can be passed therethrough unlike the bag filter 120. Accordingly, the exhaust gas can be fed to the catalytic reactor 121 at a temperature in the range of about 210 to about 450° C. and permitting the catalyst to retain its activity, so that at least the exhaust gas heating unit 122 for reheating the cooled exhaust gas can be omitted from the flue between the metal filter F and the catalytic reactor. FIG. 8 shows an apparatus wherein the exhaust gas heating unit 122 (see FIG. 15) is dispensed with.

Next, a description will be given of a metal filter which is adapted to trap dust as separated from the gas to be treated and which has a catalyst reaction portion for removing harmful substances, such as nitrogen oxides and dioxin, from the gas to be treated.

The metal filter having the catalyst reaction portion is suited for use in combustion exhaust gas treating apparatus for incinerators for refuse such as garbage as seen in FIG. 9. With reference to FIG. 9, a flue 102 for guiding the combustion exhaust gas from a refuse incinerator 101 as a combustion unit to a chimney 106 is provided with a unit 103 for adjusting the temperature of the exhaust gas, a high-temperature dust removing unit 110 and an exhaust gas cleaning unit 104A which are arranged in succession. The exhaust gas is sent from the cleaning unit 104A toward the chimney 106 by an induced draft blower 105. Between the exhaust gas temperature adjusting unit 103 and the dust removing unit 110, the flue 102 has a reducing agent feeder 107 for injecting a reducing agent into the flue. The reducing agent feeder 107, the exhaust gas temperature adjusting unit 103 and the dust removing unit 110 having the flue 102 extending therethrough provide the exhaust gas treating apparatus.

The cleaning unit 104A is adapted to clean the exhaust gas to further remove noxious gases, such as hydrochloric acid, remaining in the exhaust gas while cooling the gas also as an exhaust gas cooling unit 104. The temperature adjusting unit 103 serves to adjust the temperature of the exhaust gas when the gas temperature exceeds the temperature specified for the high-temperature dust removing unit 110.

The dust removing unit 110 is divided into upper and lower two chambers. The exhaust gas is introduced into the lower chamber, and the gas as cleaned is discharged from the upper chamber.

As shown in FIG. 10A, a filter F has a tubular main body 1 extending downward in the lower chamber and attached to a partition wall 110a between the upper and lower chambers. The main body 1 has an upper end open toward the upper chamber and a lower end closed with an end plate 111a. With reference to FIG. 10A, the filter F comprises a tubular filter portion 111, and a porous tubular support member 115 provided inside the filter portion to constitute the main body 1. Catalyst particles C providing a catalyst reaction portion 112 are packed in an annular space defined by the filter portion 111 and the support member 115. The catalyst particles C comprise activated carbon or activated particulate coke. The upper end of the porous support member 115 has a venturi 114 attached to the partition wall 110a and serving also as a closure for the catalyst reaction portion 112. Disposed above the partition wall 110a is reverse-pressure cleaning piping 113 serving as a reverse-pressure cleaning device. A cleaning nozzle 113a attached to the piping 113 is opposed to the opening of the venturi 114.

The exhaust gas from the refuse incinerator 101 has its temperature adjusted by being cooled to 300 to 450° C. by the temperature adjusting unit 103. Ammonia is thereafter added to the gas by the reducing agent feeder 107, and the gas is then sent to the high-temperature dust removing unit 110. As shown in FIG. 10A, the exhaust gas G passes through the filter portion 111 from outside to inside within the unit 110, is thereby cleaned of dust and comes into contact with the catalyst particles C of the reaction portion 112, whereby nitrogen oxides in the gas G are made harmless. At the same time, the contact of the gas with the ammonia and with the catalyst particles C of the reaction portion 112 makes dioxin or furan (hereinafter referred to as "dioxin or the like") present in the gas G is rendered harmless. Dioxin or the like, even if remaining, is adsorbed by the particulate coke incorporated in the catalyst particles C, with the result that the exhaust gas G cleaned of the harmful substances, such as nitrogen oxides and dioxin or the like, is sent out into the upper chamber of the dust removing unit 110. The exhaust gas cleaning unit 104A further removes harmful gases such as hydrochloric acid from the exhaust gas sent out from the dust removing unit 110 while cooling the exhaust gas at the same time. The gas is then released to the atmosphere.

It is generally said that if combustion exhaust gases containing unburnt carbon and metallic oxides are cooled, dioxin or the like is formed again at a temperature of 200 to 400° C. owing to the de novo effect, whereas unburnt carbon and metallic oxides are removed by the filter portion of the metal filter of the invention, so that there is no likelihood of formation of dioxin or the like. Moreover, with excessive cooling avoided, the loss of thermal energy can be reduced. Thus, noxious substances such as nitrogen oxides and dioxin or the like can be removed from the combustion exhaust gas while removing fine dust from the exhaust gas with good stability at the same time and also while utilizing the thermal energy of the exhaust gas.

To prevent the pores of the filters F of the high-temperature dust removing unit 110 from clogging, high-pressure air serving as a reverse-pressure cleaning fluid S is periodically injected into the filters F from the cleaning nozzles 113*a* of the reverse-pressure cleaning device as seen in FIG. 10B. The injection pressure of the high-pressure air S is maintained within each filter portion 111 by the venturi 114 to clean the surfaces of the catalyst particles C and remove soot and dust deposited in the filter portion 111. The adhering dust forced out from the outer surface of the filter portion 111 by the injection of the air S is drawn off through a rotary valve 116 disposed in the bottom of the dust removing unit 110 and discharged by a screw conveyor 117. Heated high-pressure air or superheated steam may alternatively be used as the cleaning fluid S; a fluid suitable for regenerating the catalyst can be used. If a high-pressure gas for regenerating the catalyst is used as the reverse-pressure cleaning fluid, the catalyst reaction portion can be treated for regeneration simultaneously with reverse-pressure cleaning.

Figure 11A:
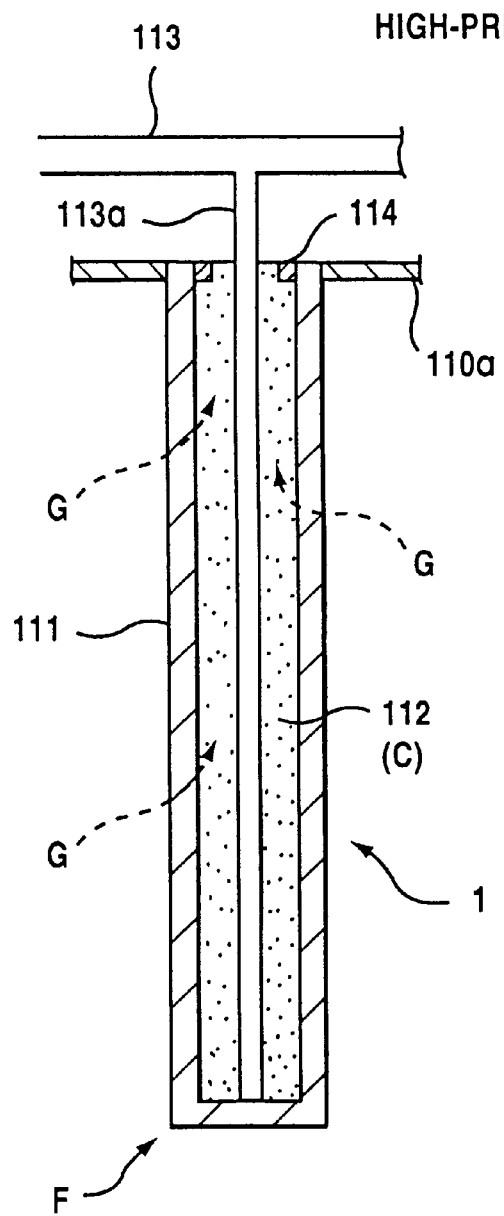
FIGS. 11A and 11B are views in vertical section showing another embodiment of metal filter of the invention having a catalyst reaction portion.
Figure 11B:
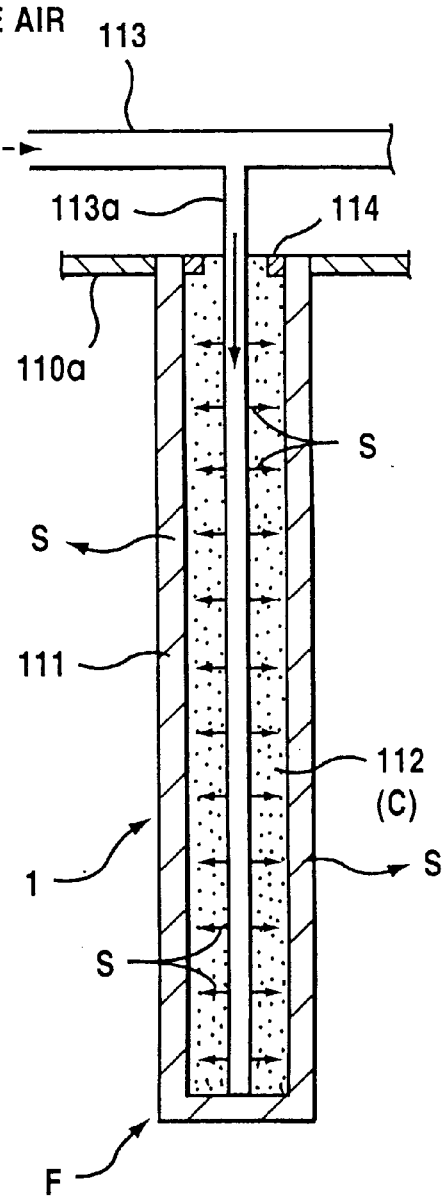

FIGS. 11A and 11B show another embodiment of filter F, which has no porous support member 115 (see FIG. 10A) but has a cleaning nozzle 113*a* extending to the bottom of a filter portion 111 in the form of a bottomed hollow cylinder. As seen in FIG. 11B, ports for injecting a reverse-pressure cleaning fluid are formed in the side portion of the nozzle 113*a*, and catalyst particles C can be filled in the filter portion 111 around the nozzle 113*a* to provide a catalyst reaction portion 112. The entire flow channel for the exhaust gas G inside the filter portion 111 is then formed as the catalyst reaction portion 112, permitting the gas G to come into contact with the catalyst particles C more frequently, while the cleaning fluid S is supplied to the whole mass of catalyst particles C to effectively regenerate the catalyst particles C.

Figures 12A, 12B:
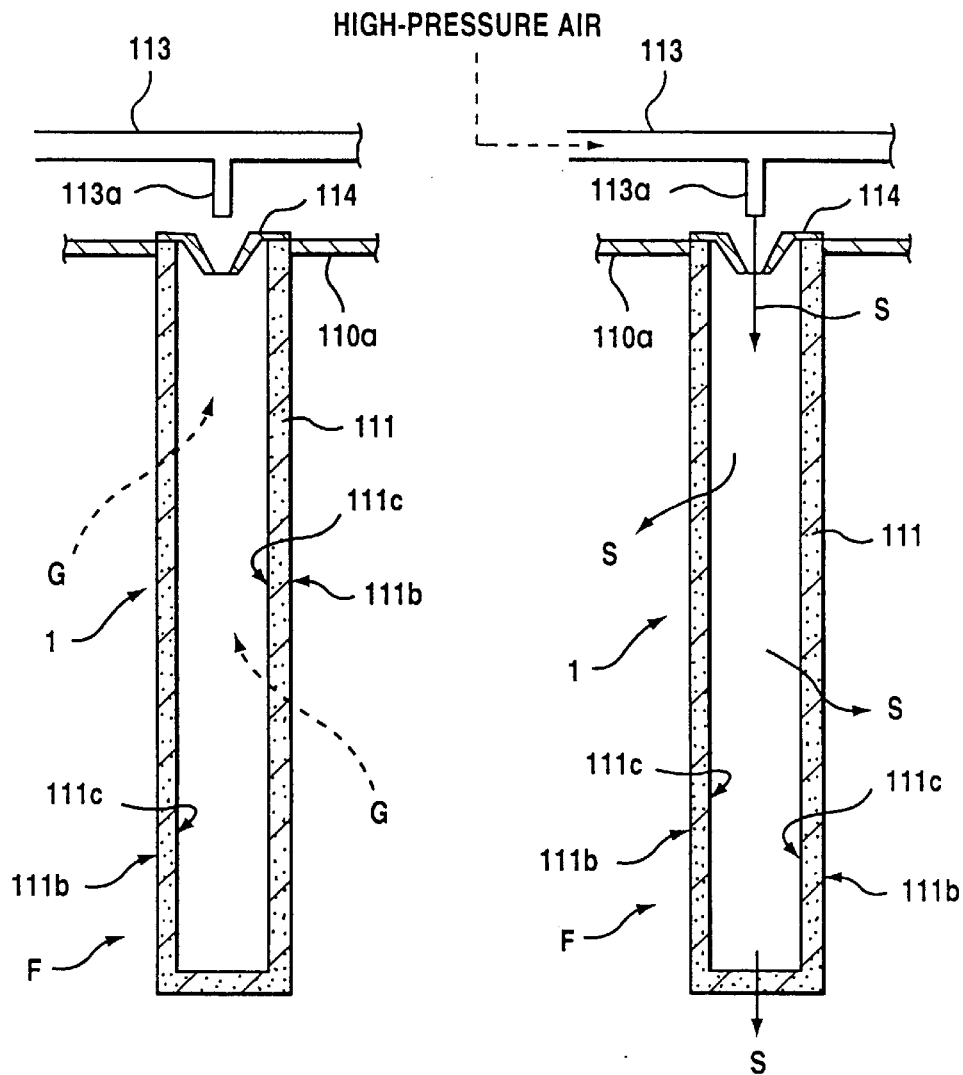
FIGS. 12A, 12B and 12C are views in vertical section showing another embodiment of metal filter of the invention having a catalyst reaction portion.
Figure 12C:
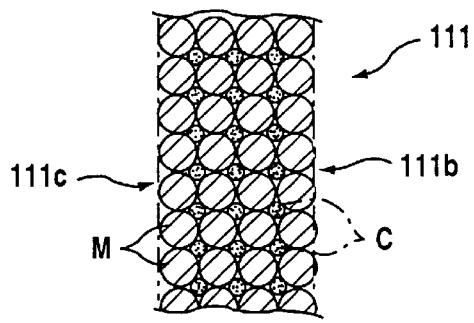

FIGS. 12A and 12B show another embodiment of filter F, wherein catalyst particles C may be accommodated in part of the pores of a tubular filter portion 111. As shown in a fragmentary enlarged sectional view of FIG. 12C, a mixture of metal particles M having a uniform particle size, for example, of 120 μm and catalyst particles C having a uniform particle size of 25 to 30 μm and suitably made present in interstices between metal particles M is sintered by hot isostatic pressing, whereby the filter portion 111 can be formed with the catalyst particles confined therein. As shown in FIG. 12A, the exhaust gas G passing through the filter portion 111 comes into contact with the catalyst particles C confined in pores thereof during the passage to remove harmful substances from the gas G through a catalytic reaction. The filter portion 111 is regenerated with superheated steam injected from a cleaning nozzle 113*a* provided as a reverse-pressure cleaning device. The soot and dust arrested by the outer surface 111*b* of the filter portion 111 are forced off by the steam, which at the same time comes into contact with the surfaces of the catalyst particles C confined between the outer surface 111*b* and the inner surface 111*c* of the filter portion 111, whereby the catalyst particles can be regenerated (see FIG. 12B).

With the embodiment shown in FIGS. 12A and 12B, it is desired to use filter portion forming metal particles which are generally uniform in particle size and to use catalyst particles having a particle size greater than the pore size in the surface of the filter portion and permitting the catalyst particles to be accommodated in the interstices between the metal particles with a clearance formed in the interstices. This makes the pores uniform in size, prevents the release of the catalyst particles from the filter portion and provides a flow channel for the exhaust gas. Thus, making the metal particles to be sintered uniform in size obviates the presence of metal particles that would fill the interstices surrounded by the adjacent metal particles, reliably forming spaces for accommodating the catalyst particles between the metal particles. It is known that the minimum particle size of dust to be arrested by such a filter comprising a sintered body is 13 to 20% of the size of the metal particles although the minimum particle size and the minimum size of the spaces are dependent on the shape of metal particles. Accordingly, the catalyst particles which are 20 to 30% of the metal particles in particle size can be satisfactorily confined in the spaces between the metal particles while ensuring the contact and bond between the adjacent metal particles, so that when catalyst particles which are sized in this range are selected for use, the catalyst particles can be confined within the sintered metal body while assuring the gas of its flow channel. As a result, a filter for use at a high temperature can be provided which satisfactorily permits the gas to pass therethrough, incorporates a catalyst therein and permits the fluid to reliably come into contact with the catalyst during passage to undergo a catalytic reaction. Accordingly, a combustion exhaust gas treating apparatus can be provided which stably removes fine dust from the exhaust gas and at the same time removes noxious substances from the gas utilizing the temperature of the gas.

FIGS. 13A and 13B show another embodiment of filter F, which comprises a tubular filter portion 111 and a tubular porous support portion 117 disposed inside the inner surface of the filter portion to constitute a main body 1, with catalyst particles C accommodated partly in pores of the support portion 117. The support portion 117 having the catalyst confined therein can be regenerated in the same manner as the filter portion 111 previously described (see FIG. 13B).

While a catalyst for removing nitrogen oxides is used for the catalyst particles C, the catalyst may be admixed with a catalyst for removing dioxin or the like. Further activated carbon (which may be replaced by activated coke) may be caused to support these catalysts thereon to obtain catalyst particles for use. The catalyst particles include those incorporating adsorbent particles.

Figure 14:
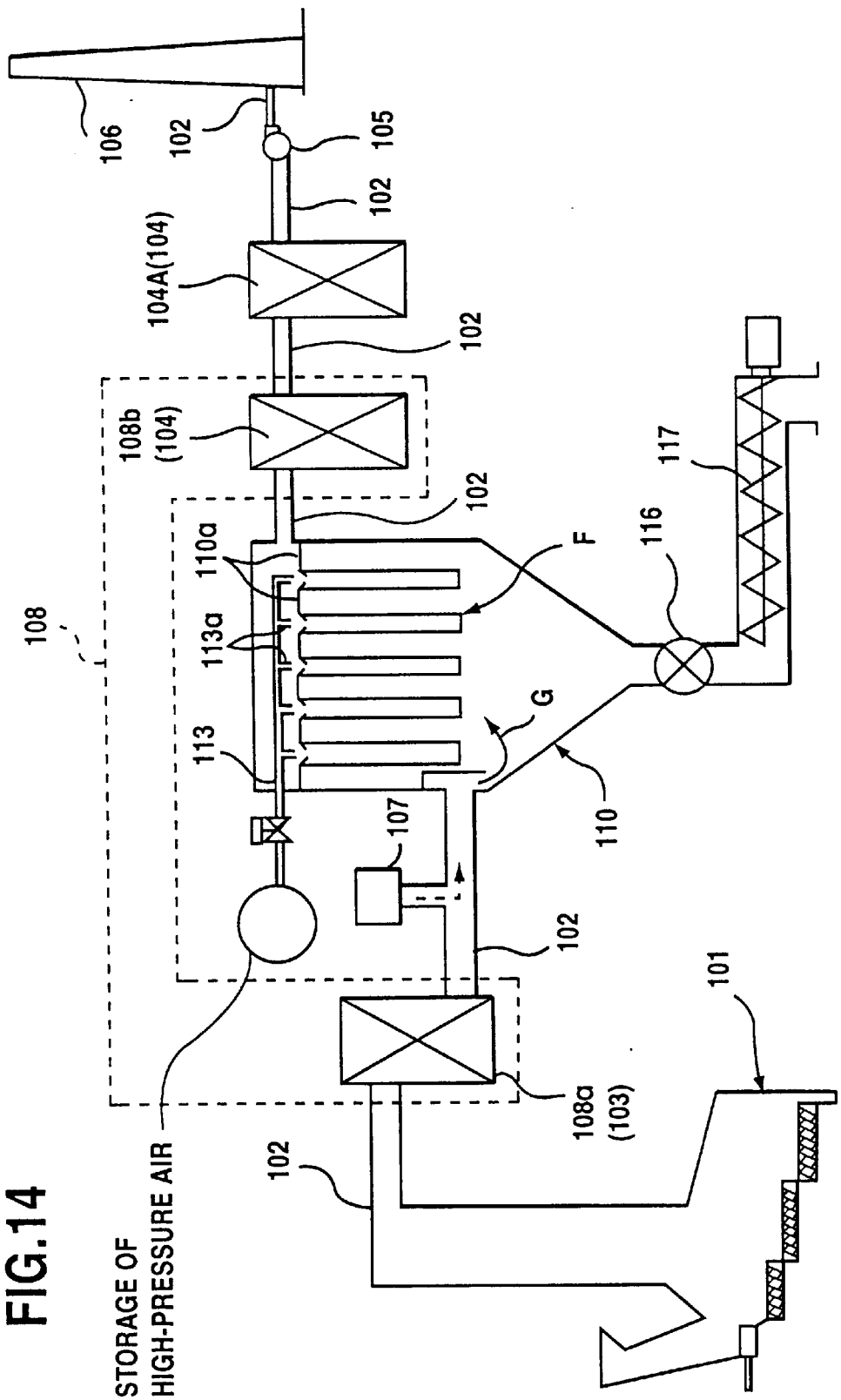
FIG. 14 is a diagram for illustrating another example of combustion exhaust gas treating apparatus of the invention.

As seen in FIG. 14, the exhaust gas treating apparatus comprising the metal filter of the invention for use at a high temperature may include a waste heat boiler 108 provided for a refuse incinerator 101 and having a steam generator 108*a* serviceable as a exhaust gas temperature adjusting unit 103. A water preheater 108*b* for preheating the water to be supplied to the steam generator 108*a* may be used as a replacement for the exhaust gas cleaning device 104A so as to function as an exhaust gas cooling unit 104.

The exhaust gas cooling unit 104 can be dispensed with depending on the construction of the equipment provided with a combustion unit, such as municipal garbage incinerator equipment.

The metal filter of the invention for use at high temperatures for exhaust gas treating apparatus for refuse incinerators are also suited for uses involving a need to separate dust from high-temperature gases, for example, as a filter for use in coal gasification complex electric power plants and pressurized fluidized bed boiler plants.

What is claimed is:

1. A sintered porous metal filter permitting passage of gases therethrough, the filter comprising:

a filter portion having specified pores for trapping dust as separated from the gas to be treated, the pores of the filter portion having partly accommodated therein catalyst particles for undergoing a catalytic reaction with harmful substances contained in the gas to be treated to render the harmful substances harmless, the filter portion comprising metal particles and being formed by hot isostatic pressing of the metal particles and the catalyst particles as suitably made present in interstices between the metal particles.

2. The metal filter as defined in claim 1 wherein the filter portion forming metal particles used are generally uniform in particle size, and the catalyst particles have a particle size greater than the pore size in a surface of the filter portion and permitting the catalyst particles to be accommodated in interstices between the metal particles with a clearance formed in the interstices.

3. A sintered porous metal filter permitting passage of gases therethrough, the filter comprising:

a filter portion having specified pores for trapping dust as separated from the gas to be treated, and a support portion for supporting the filter portion, the support portion having pores greater than the pores of the filter portion to diminish the pressure loss of the gas to be treated, the pores of the support portion having partly accommodated therein catalyst particles for undergoing a catalytic reaction with harmful substances contained in the gas to render the harmful substances harmless, the filter portion comprising metal particles of small diameter, the support portion comprising metal particles having a greater diameter than the filter portion forming metal particles, the filter portion and the support portion being formed to provide an outer side and an inner side integral therewith by hot isostatic pressing of the metal particles of different diameters and catalyst particles as suitably made present in interstices between the support portion forming metal particles.

4. A sintered porous metal filter permitting passage of gases therethrough, the filter comprising:

a filter portion having specified pores for trapping dust as separated from the gas to be treated, and a catalyst reaction portion for undergoing a catalytic reaction with harmful substances contained in the gas to render the harmful substances harmless, the filter portion and the catalyst reaction portion being formed to provide an outer side and an inner side integral therewith by hot isostatic pressing of metal particles for forming the filter portion and catalyst particles for forming the reaction.

5. The metal filter as defined in claim 4 wherein the catalyst reaction portion is provided on a surface thereof opposite to the filter portion with a porous support member for holding the catalyst reaction portion.

* * * * *